UNITED STATES PATENT OFFICE.

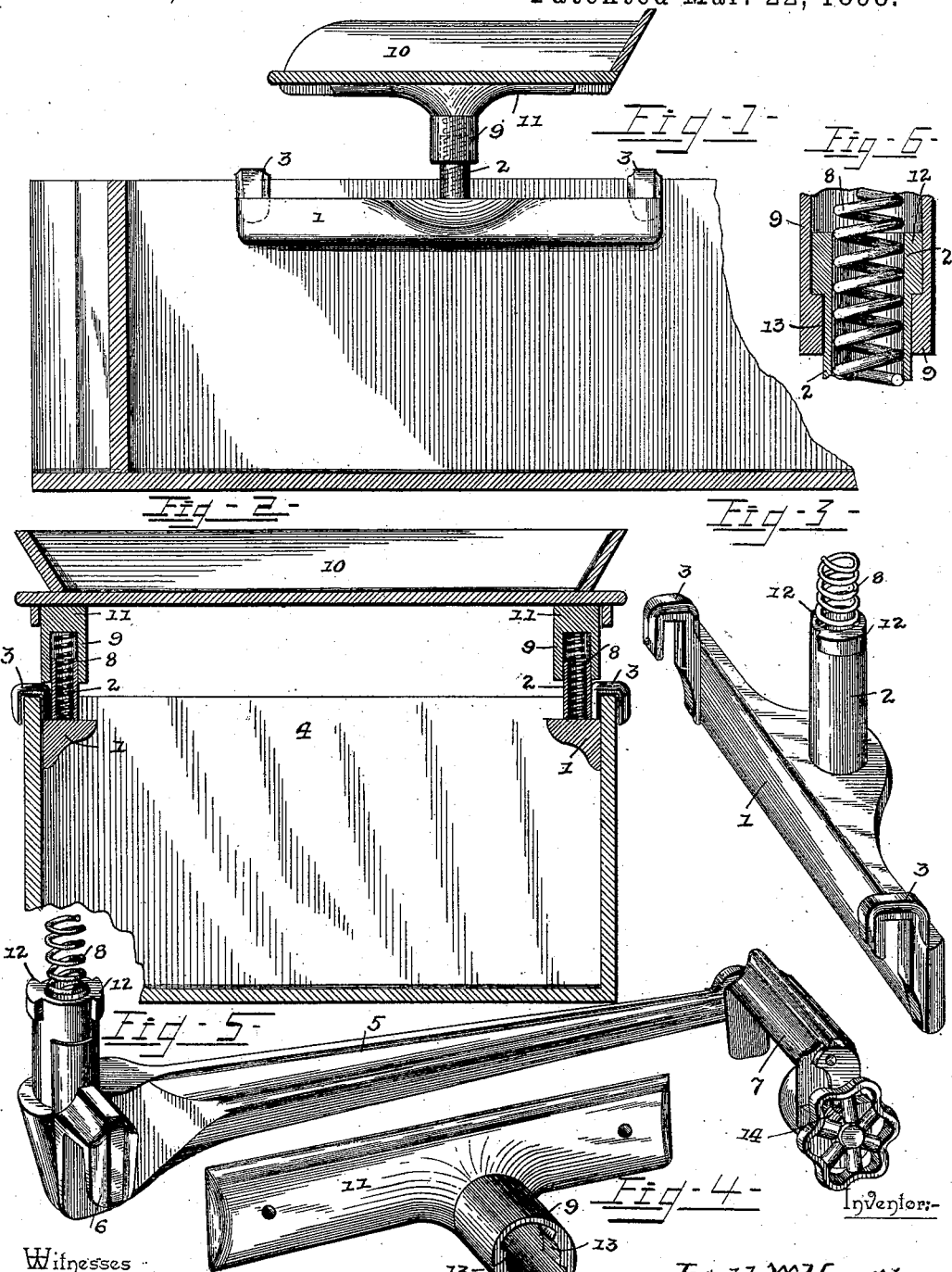

JOSEPH W. UNCAPHER, OF COFFEYVILLE, KANSAS, ASSIGNOR OF ONE-FOURTH TO ELMER E. WILSON, OF SAME PLACE.

ATTACHMENT FOR VEHICLE-SEATS.

SPECIFICATION forming part of Letters Patent No. 601,186, dated March 22, 1898.

Application filed November 18, 1897. Serial No. 659,005. (No model.)

*To all whom it may concern:*

Be it known that I, JOSEPH W. UNCAPHER, a citizen of the United States, residing at Coffeyville, in the county of Montgomery and State of Kansas, have invented a new and useful Attachment for Vehicle-Seats, of which the following is a specification.

The invention relates to improvements in attachments for vehicle-seats.

The object of the present invention is to improve the manner of mounting vehicle-seats and dispense with elliptical springs, and to provide a simple, strong, and durable construction adapted to enable coiled springs to be employed for supporting vehicle-seats and capable of concealing the same and protecting them from the weather.

The invention consists in the construction and novel combination and arrangement of parts, as hereinafter fully described, illustrated in the accompanying drawings, and pointed out in the claims hereto appended.

In the drawings, Figure 1 is a longitudinal sectional view of a portion of a vehicle having a seat mounted in accordance with this invention, the seat-supporting devices being shown in side elevation. Fig. 2 is a transverse sectional view. Fig. 3 is a detail perspective view of the body-engaging bar. Fig. 4 is a similar view of the seat socket or sleeve. Fig. 5 is a detail perspective view of a pivoted bar provided with a spring-socket and having a hook at one end and a clip or clamp at the other. Fig. 6 is a detail sectional view illustrating the arrangement of the lugs or flanges when the telescoping sockets are interlocked.

Like numerals of reference designate corresponding parts in all the figures of the drawings.

1 designates a horizontal bar provided with a central vertical socket 2 and having hooks 3 at its ends adapted to engage the upper edge of one side of a vehicle-body 4, the bar 1 being arranged on the inner face thereof, as clearly illustrated in Fig. 1 of the accompanying drawings. The socket 2, although shown centrally mounted on the bar 1, may be arranged at the end of a pivoted bar 5, provided at one end with a hook 6 and pivotally connected at its other end to a clip or clamp 7, whereby the bar is adapted to be swung forward out of the way. The said socket 2, which is connected with the vehicle-body, forms a seat for a coiled spring 8 and has a sleeve or socket 9 telescoping on it and connected with a seat 10. The spring supports the sleeve or socket 9 and bears against the top of the same, forming a cushion and adapted to cushion the seat similar to an ordinary spring.

The vertically-movable sleeve or socket 9 is provided at its upper end with an attachment-bar 11, which is suitably fastened to the bottom of the seat 10, and the upward movement of the sleeve or socket 9 is limited by curved lugs or flanges 12 and 13, disposed at diametrically opposite points on the exterior of the socket 2 and the interior of the sleeve or socket 9. The lugs 12, which are located at the upper end of the socket 2, are spaced apart to form a substantially L-shaped passage or way for the lugs or flanges 13, which are passed through the said passage when the attachment-bar is disposed longitudinally of the seat. After the lugs or flanges 13 have passed the lugs or flanges 12 the attachment-bar 11 is partially rotated to bring it transversely of the seat and carry the lugs 13 directly beneath those of the socket 2. By this construction the sleeve or socket 9 is permitted a limited vertical movement on the socket 2 to permit the spring to cushion the seat, and the lugs prevent it from leaving the said socket 2. The telescoping sockets form a casing for the coiled spring and conceal and protect the same from the weather.

The clip which engages the upper edge of the side of the wagon-body is provided with a clamping-screw 14, which is engaged and held against backward movement by a locking device constructed in accordance with the patent granted June 1, 1897, to Charles F. Deplanty and Elmer E. Wilson, No. 583,673; but any other form of clamp and locking device may be employed, if desired.

It will be clear that the invention has the following advantages: The coiled spring is housed and concealed within the telescoping sockets and is protected by them from the weather, the sockets are detachably interlocked and are limited in their sliding movement by the lugs or flanges, and this form of cushion dispenses with elliptical springs.

Changes in the form, proportion, and minor details of construction may be resorted to without departing from the spirit or sacrificing any of the advantages of this invention, such as adapting the detachably-interlocked sockets and the cushioning-spring for use on other parts of a vehicle—for instance, for supporting the body.

What I claim is—

1. In a device of the class described, the combination of the lower vertical socket provided at its top with lugs or flanges spaced apart to provide passages, the vertically-movable telescoping sleeve or socket provided at its lower end with interior lugs or flanges adapted to be passed through the spaces between the lugs or flanges of the lower socket, said sleeve or socket being adapted to be rotated to carry its lugs or flanges directly beneath those of the lower socket, and a cushioning coiled spring seated in the lower socket and engaging the upper sleeve or socket, substantially as and for the purpose described.

2. In a device of the class described, the combination of a horizontal bar provided with means for engaging the upper edges of a wagon-body, the upper and lower telescoping sockets having a limited movement on each other, one of the sockets being provided with a substantially L-shaped way and the other socket engaging said way, said sockets being adapted to be connected and disconnected by partially rotating them on each other and sliding them longitudinally, a coiled spring housed within the sockets, and means for connecting the upper socket with a seat, substantially as described.

3. In a device of the class described, the combination of a horizontal bar designed to be mounted on a vehicle-body, a socket rising from the horizontal bar and provided at its upper end with opposite curved lugs spaced apart to provide passages, a vertically-movable telescoping sleeve or socket mounted on the lower socket and provided on its interior with lugs arranged to pass through the spaces between the lugs of the lower socket, said sleeve or socket being provided at its upper end with an attachment bar or plate and adapted to be partially rotated to carry its lugs beneath those of the lower socket, and a coiled spring arranged within the sockets, substantially as described.

4. In a device of the class described, the combination with a horizontal bar provided with means for engaging the upper edges of a wagon-body, and a wagon-seat, of a pair of telescoping sockets connected respectively with the bar and the vehicle-seat, a coiled spring housed within the sockets and cushioning the seat, and lugs projecting from the outer face of one socket and the inner face of the other and limiting the movement of the sockets on each other when the parts are assembled, said lugs being arranged to permit the sockets to be separated by slightly rotating them on each other, substantially as described.

In testimony that I claim the foregoing as my own I have hereto affixed my signature in the presence of two witnesses.

JOSEPH W. UNCAPHER.

Witnesses:
J. H. WILCOX,
FRANK M. WILMOTH.